US011695982B2

(12) United States Patent
Lee et al.

(10) Patent No.: US 11,695,982 B2
(45) Date of Patent: Jul. 4, 2023

(54) CONTENT CASTING METHOD AND ELECTRONIC DEVICE THEREFOR

(71) Applicant: Samsung Electronics Co., Ltd., Gyeonggi-do (KR)

(72) Inventors: Seonho Lee, Gyeonggi-do (KR); Hosung You, Gyeonggi-do (KR); Kyungtae Kim, Gyeonggi-do (KR); Bunam Jeon, Gyeonggi-do (KR); Yoonjeong Choi, Gyeonggi-do (KR); Taeho Ha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/298,216

(22) PCT Filed: Dec. 3, 2019

(86) PCT No.: PCT/KR2019/016945
§ 371 (c)(1),
(2) Date: May 28, 2021

(87) PCT Pub. No.: WO2020/116902
PCT Pub. Date: Jun. 11, 2020

(65) Prior Publication Data
US 2022/0095011 A1 Mar. 24, 2022

(30) Foreign Application Priority Data
Dec. 4, 2018 (KR) .................. 10-2018-0154478

(51) Int. Cl.
*H04N 21/4363* (2011.01)
*H04N 21/45* (2011.01)
(Continued)

(52) U.S. Cl.
CPC ..... *H04N 21/43637* (2013.01); *H04N 21/458* (2013.01); *H04N 21/4532* (2013.01);
(Continued)

(58) Field of Classification Search
CPC ................................................ H04N 21/43637
See application file for complete search history.

(56) References Cited

U.S. PATENT DOCUMENTS 8,423,627 B2    4/2013   Cha et al.
8,620,949 B2   12/2013   Son et al.
(Continued)

FOREIGN PATENT DOCUMENTS

JP      2009-044435      2/2009
KR    10-2006-0017000    2/2006
(Continued)

OTHER PUBLICATIONS

PCT/ISA/210 Search Report issued on PCT/KR2019/016945, dated Apr. 2, 2020, pp. 5.
(Continued)

*Primary Examiner* — Michael H Hong
(74) *Attorney, Agent, or Firm* — The Farrell Law Firm, P.C.

(57) ABSTRACT

According to various embodiments, a content casting method of an electronic device may comprise: an operation of obtaining a content list including a plurality of pieces of content information from an external server; an operation of selecting at least one piece of content from the content list on the basis of at least one of the state of a user, the type of content, and the state of an external electronic device; and an operation of transmitting information on the selected at least one piece of content to the external electronic device so as to cause the external electronic device to play the selected at least one piece of content through a short-range wireless network. Additional various embodiments identified through the specification are possible.

7 Claims, 10 Drawing Sheets

(51) Int. Cl.
*H04N 21/458* (2011.01)
*H04N 21/472* (2011.01)
*H04N 21/482* (2011.01)
*H04N 21/81* (2011.01)

(52) U.S. Cl.
CPC ... *H04N 21/47214* (2013.01); *H04N 21/4825* (2013.01); *H04N 21/812* (2013.01)

(56) References Cited

U.S. PATENT DOCUMENTS

| | | | |
|---|---|---|---|
| 8,676,936 B2 | 3/2014 | Cha et al. | |
| 9,678,579 B2 | 6/2017 | Perez et al. | |
| 9,894,413 B2 | 2/2018 | Oztaskent et al. | |
| 10,455,281 B2 | 10/2019 | Oztaskent et al. | |
| 2002/0083434 A1 | 6/2002 | Bacso et al. | |
| 2002/0112240 A1 | 8/2002 | Bacso et al. | |
| 2002/0116510 A1 | 8/2002 | Bacso et al. | |
| 2002/0124182 A1 | 9/2002 | Bacso et al. | |
| 2006/0059259 A1 | 3/2006 | Bacso et al. | |
| 2008/0070548 A1 | 3/2008 | Cha et al. | |
| 2009/0044223 A1 | 2/2009 | Jiang | |
| 2009/0199230 A1* | 8/2009 | Kumar | G06Q 30/0268 725/32 |
| 2011/0119365 A1 | 5/2011 | Cha et al. | |
| 2011/0289522 A1* | 11/2011 | Pontual | H04N 21/2543 725/38 |
| 2012/0143902 A1 | 6/2012 | Son et al. | |
| 2013/0330063 A1* | 12/2013 | Bonovich | H04N 21/4222 386/292 |
| 2015/0073924 A1* | 3/2015 | Wickramasuriya | G06Q 30/0277 705/14.73 |
| 2015/0312648 A1* | 10/2015 | Zhang | H04N 21/4122 725/110 |
| 2015/0365722 A1 | 12/2015 | Oztaskent et al. | |
| 2015/0381437 A1 | 12/2015 | Perez et al. | |
| 2018/0310070 A1* | 10/2018 | Murray | H04N 21/4622 |
| 2019/0069015 A1* | 2/2019 | Kiley | H04N 21/218 |
| 2020/0053424 A1 | 2/2020 | Oztaskent et al. | |

FOREIGN PATENT DOCUMENTS

| | | |
|---|---|---|
| KR | 10-2012-0062982 | 6/2012 |
| KR | 10-2014-0007126 | 1/2014 |
| KR | 10-1443773 | 10/2014 |

OTHER PUBLICATIONS

PCT/ISA/237 Written Opinion issued on PCT/KR2019/016945, dated Apr. 2, 2020, pp. 4.

* cited by examiner

CONTENT CASTING METHOD AND ELECTRONIC DEVICE THEREFOR

PRIORITY

This application is a National Phase Entry of PCT International Application No. PCT/KR2019/016945, which was filed on Dec. 3, 2019, and claims priority to Korean Patent Application No. 10-2018-0154478, which was filed on Dec. 4, 2018, the entire content of each of which is incorporated herein by reference.

TECHNICAL FIELD

The present disclosure relates to a content casting method and an electronic device therefor.

BACKGROUND ART

With the wide spread of electronic devices having an Internet connection function, the Internet-of-things (IoT) is being built. In the Internet-of-things (IoT) environment, electronic devices connected via the Internet may collect, share, and analyze data to provide more intelligent services. For example, using data associated with a user, an electronic device may provide a service that has been provided in the electronic device using another electronic device of the user.

When a TV has an Internet connection, content (e.g., movies, music, and/or multimedia) from a contents provider (CP) may be played on the TV via the Internet. For example, the user of a mobile device may want the content provided from a contents provider to be played on the TV as well as the mobile device. The user may want to watch the content that has been watched by the user on the mobile device using another electronic device (e.g., TV).

When information related to the content, which might be desired to be watched, is stored in the electronic device, the user may want to watch the content at a desired time or a free time.

DISCLOSURE OF THE INVENTION

Technical Problem

When the user wants the content that has been played on a mobile device to be played through a TV, the user may cast contents to the TV. For continuous content playback, the user may make a playback reservation for a plurality of contents on the TV. For example, the user may make a playback reservation by adding the content desired to be played to the queue of the TV.

The user may make the playback reservation for the contents desired to be played in the queue of the TV by transmitting a content list to the TV. The TV may sequentially play the contents of the queue. For example, the user may deliver a content list provided by a contents provider to the TV. In this case, a content list irrelevant to the situation of the user may be delivered to the TV. Therefore, regardless of the situation of the user, the TV may sequentially play the contents according to the received content list.

For example, when the user wants to watch the contents for a specified time, the user may have to directly designate the contents corresponding to the specified time and cast them to the TV, or stop playing the contents before completing the playback.

If the user stores information related to the contents wanted to be watched in an electronic device, the user may select at least some of the contents when the user is able to watch the contents and watch the selected contents.

In various embodiments of the present disclosure, a method for playing contents in consideration of a user state is disclosed.

Technical Solution

According to an aspect of the present disclosure, there is provided an electronic device including: a display; a communication circuit; a processor operatively connected with the display and the communication circuit; and a memory operatively connected with the processor, in which the memory stores instructions that, when executed, cause the processor to: obtain a content list including information on a plurality of contents from an external server by using the communication circuit; select at least one content from the content list based on at least one of a user state, a content type, or an external electronic device state; and transmit information on the selected at least one content to the external electronic device in order to cause the external electronic device to play the selected at least one content through a short-range wireless network by using the communication circuit.

According to another aspect of the present disclosure, there is provided a content casting method of an electronic device, including: obtaining a content list including information on a plurality of contents from an external server; selecting at least one content from the content list based on at least one of a user state, a content type, or an external electronic device state; and transmitting information on the selected at least one content to the external electronic device in order to cause the external electronic device to play the selected at least one content through a short-range wireless network.

According to another aspect of the present disclosure, there is provided a content casting system including an electronic device and an external electronic device, in which the electronic device is configured to obtain a content list including information on a plurality of contents from an external server, select at least one content from the content list based on at least one of a user state, a content type, or an external electronic device state; and transmit information on the selected at least one content to the external electronic device in order to cause the external electronic device to play the selected at least one content through a short-range wireless network, and the external electronic device is configured to add the information on the selected at least one content to a queue if the information on the selected at least one content is received, and play contents stored in the queue.

Advantageous Effects

According to various embodiments disclosed in the present disclosure, a method for playing contents in consideration of a user state may be provided.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments disclosed in the present disclosure will be described with reference to the accompanying drawings. It should be appreciated that embodiments and the terms used therein are not intended to limit the technologies set forth herein to particular embodiments and include various changes, equivalents, and/or replacements for a corresponding embodiment.

Figure 1:
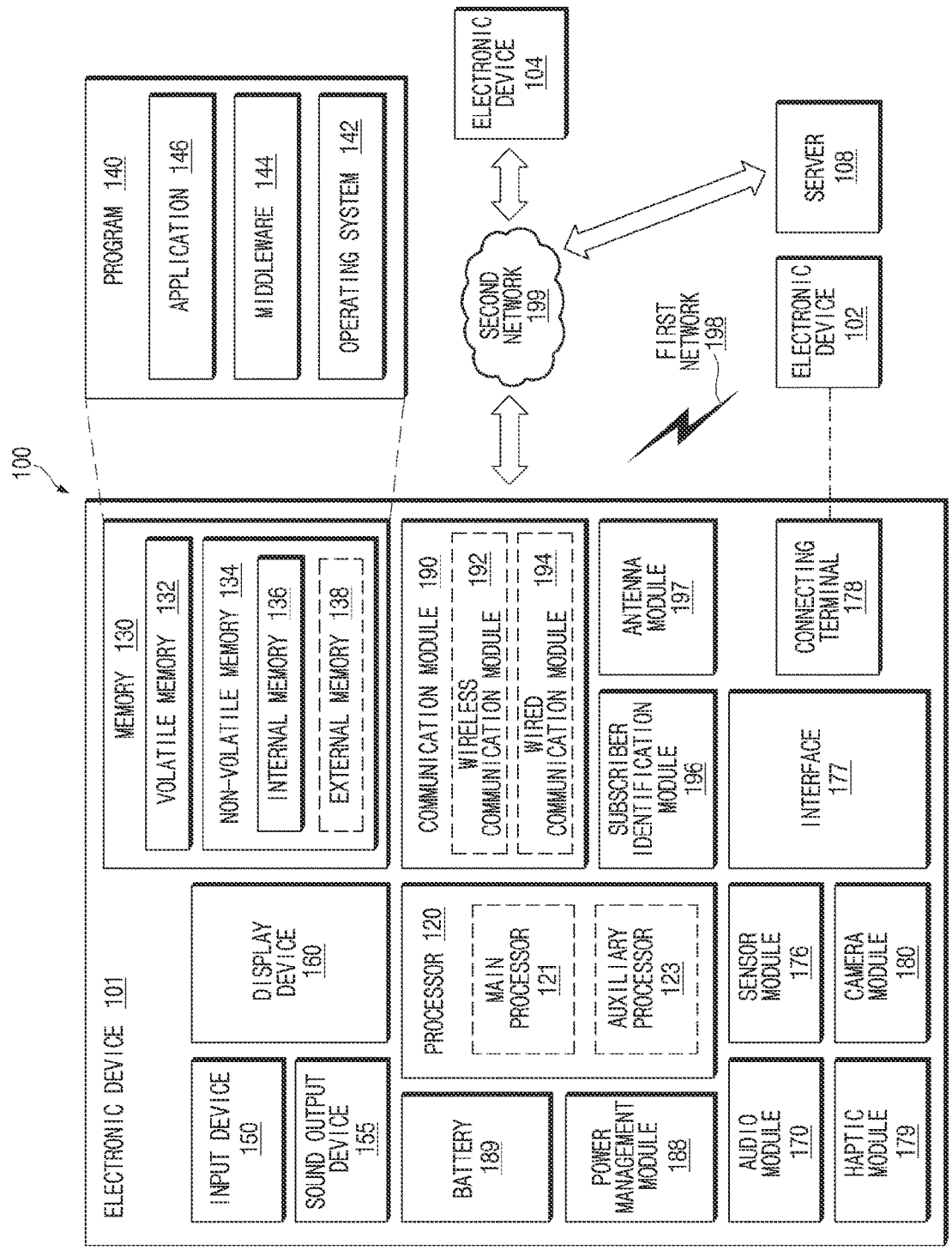
FIG. 1 illustrates a block diagram of an electronic device in a network according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
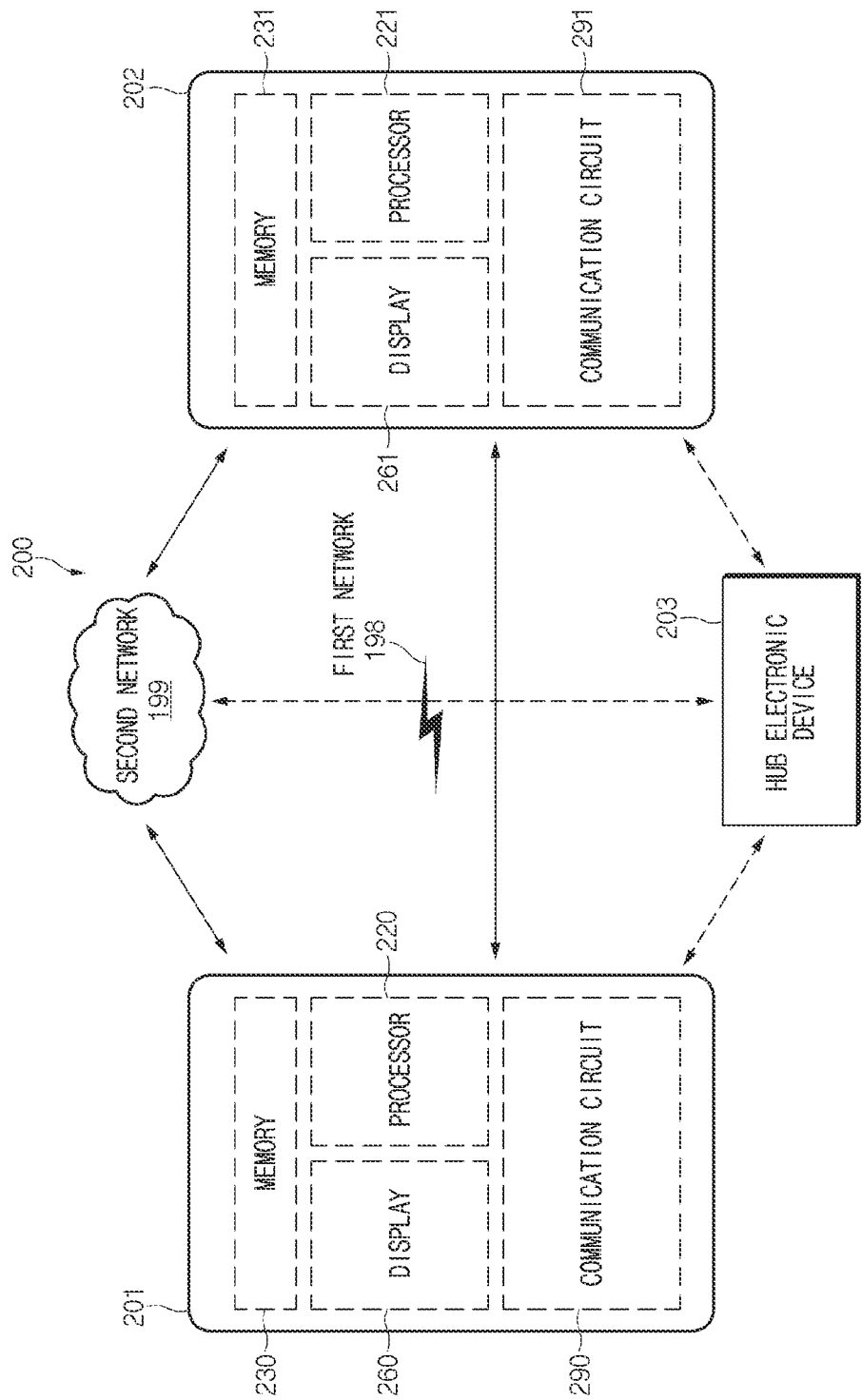
FIG. 2 illustrates a content playback environment according to various embodiments of the present disclosure.

FIG. 2 illustrates a content playback environment 200 according to various embodiments of the present disclosure.

According to various embodiments of the present disclosure, the content playback environment 200 may include an electronic device 201 (e.g., a mobile phone, a desktop, or a laptop) and an external electronic device 202 (e.g., a TV). For example, the content playback environment 200 may include various electronic devices capable of playing content, such as a hub electronic device 203 (e.g., an artificial intelligence (AI) speaker). Each of the electronic device 201, the external electronic device 202, and the hub electronic device 203 may have a structure similar to that of the electronic device 101 of FIG. 1.

According to various embodiments of the present disclosure, the electronic device 201 may include a processor 220 (e.g., the processor 120 of FIG. 1), a memory 230 (e.g., the memory 130 of FIG. 1), a display 260 (the display device 160 of FIG. 1), and a communication circuit 290 (e.g., the communication module 190 of FIG. 1). For example, the processor 220 may be operatively connected with the memory 230, the display 260, and the communication circuit 290. Operations of the electronic device 201 may be performed by the processor 220. For example, the memory 230 may store instructions that cause the processor 220 to perform specified operations. The configuration of the electronic device 201 illustrated in FIG. 2 is exemplary, and the configuration of the electronic device 201 is not limited thereto. For example, the electronic device 201 may further include a component not illustrated in FIG. 2.

According to various embodiments of the present disclosure, the external electronic device 202 may include a processor 221 (e.g., the processor 120 of FIG. 1), a memory 231 (e.g., the memory 130 of FIG. 1), a display 261 (the display device 160 of FIG. 1), and a communication circuit 291 (e.g., the communication module 190 of FIG. 1). For example, the processor 221 may be operatively connected with the memory 231, the display 261, and the communication circuit 291. Operations of the external electronic device 202 may be performed by the processor 221. For example, the memory 231 may store instructions that cause the processor 221 to perform specified operations. The configuration of the external electronic device 202 illustrated in FIG. 2 is exemplary, and the configuration of the external electronic device 202 is not limited thereto. For example, the external electronic device 202 may further include a component not illustrated in FIG. 2.

According to various embodiments of the present disclosure, the electronic device 201 may communicate with the external electronic device 202. For example, the electronic device 201 may communicate with the external electronic device 202 via a first network 198 (e.g., near field communication (NFC), device-to-device (D2D) communication, WiFi, electromagnetic (EM) sensing, Bluetooth, Bluetooth low energy (BLE), and/or a neighbor awareness network (NAN)). For another example, the electronic device 201 may communicate with the external electronic device 202 via a hub electronic device 203. Hereinafter, the communication between the electronic device 201 and the external electronic device 202 may be referred to as being performed via the first network 198 or via the hub electronic device 203.

According to various embodiments of the present disclosure, the electronic device 201 and the external electronic device 202 may play contents on an external server via the second network 199. For example, the electronic device 201 and the external electronic device 202 may play contents of a server (not shown) connected to the second network 199. For example, the electronic device 201 and the external electronic device 202 may access the server of the contents provider and play contents of the contents provider.

According to various embodiments of the present disclosure, the electronic device 201 may select at least one content from a content list and transmit information on the selected at least one content to the external electronic device 202. The content list may include information on a plurality of contents to be accessible via the first network 199. For example, the electronic device 201 may select at least one content from the content list provided by the contents provider. For another example, the electronic device 201 may select at least one content list from a content list set by the user. As yet another example, the electronic device 201 may select at least one content from the content list generated according to an arbitrary method.

According to various embodiments of the present disclosure, the electronic device 201 may select at least one content from the content list based on at least one of a user state, a content type, and/or an external electronic device state. For example, the user state may include a time during which the user may watch content. For example, the content type may include a content genre, a content quality (e.g., image quality and/or sound quality), and/or a content viewing restriction (e.g., a recommended age for watching). For example, the external electronic device state may include current watching channel information of the external electronic device 202 and/or current reservation information of the external electronic device 202.

According to various embodiments of the present disclosure, the electronic device 201 may control the external electronic device 202 in order to play contents and/or make a playback reservation for contents. For example, the electronic device 201 may transmit information on at least one content to the external electronic device 202. The information on at least content may include information on contents arranged in order, and hereinafter, it may be referred to as a recommended content information list. When the content list is received, the external electronic device 202 may store information on the received at least one content in a queue of the memory 231, and play contents in the order of the queue. According to an embodiment of the present disclosure, information on contents may include information for accessing the content.

Figure 3:
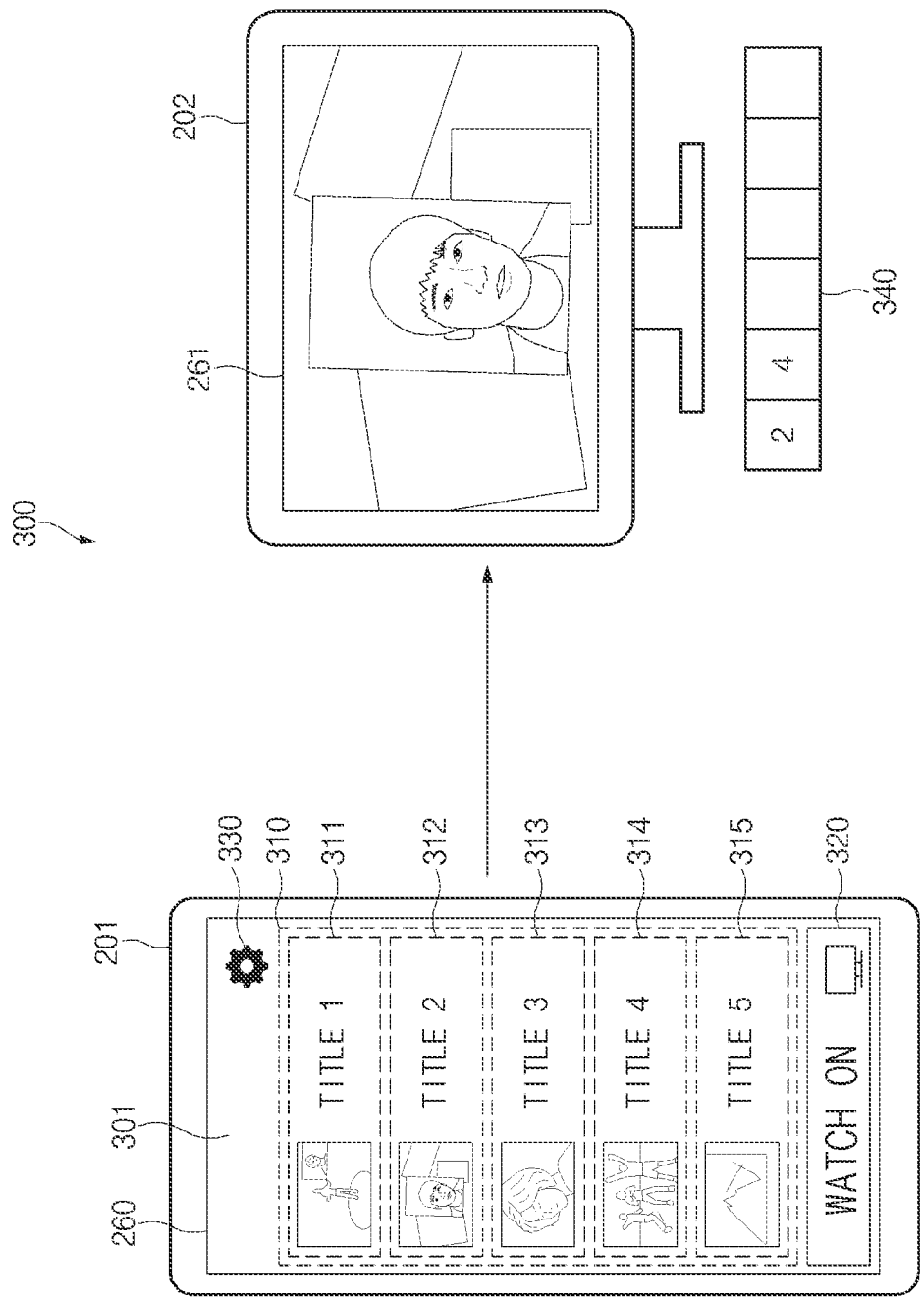
FIG. 3 illustrates an example of content casting according to various embodiments of the present disclosure.

FIG. 3 illustrates an example of content casting 300 according to various embodiments of the present disclosure.

According to various embodiments of the present disclosure, the electronic device 201 may display a first user interface (UI) 301 on the display 260. For example, the electronic device 201 may display the first UI 301 in response to the execution of a content casting application. For another example, the electronic device 201 may display the first UI 301 in response to a user input to the content casting application. According to an embodiment of the present disclosure, the content casting application may be an application that requests the external electronic device 201 to make content casting and provides information on the contents to the external electronic device 201. For example, the content casting application may perform content browsing.

According to various embodiments of the present disclosure, the first UI 301 may include a content list 310 including information on a plurality of contents. For example, the content list 310 may be generated by a contents provider related to a content casting application. For another example, the content list 310 may be set by a user. According to an embodiment of the present disclosure, the content list 310 may include information on a first content 311, information on a second content 312, information on a third content 313, information on a fourth content 314, and/or information on a fifth content 315. For example, information on each content may include a representative image of the content and/or a title of the content. The shape of the content list 310 shown in FIG. 3 is exemplary, and the shape of the content list 310 is not limited thereto. For example, the information on each content may include at least one of a representative image, title, description, author, publisher, author, playback time information, genre, information on the recommended age for watching, and/or representative video. For another example, in FIG. 5, only five contents are shown in the content list 310, but the content list 310 may further include contents not shown in the display 260.

According to various embodiments of the present disclosure, the first UI 301 may include a casting button 320 for content casting to the external electronic device 202. For example, the electronic device 201 may display the casting button 320 on the first UI 301 if the external electronic device 202 capable of performing content casting is found through a network (e.g., the first network 198 of FIG. 2). According to an embodiment of the present disclosure, when an input to the casting button 320 is received, the electronic device 201 may perform a method for content casting to the external electronic device 202. When the input to the casting button 320 is received, the electronic device 201 may select at least one content from among contents of the content list 310 and transmit information on the selected at least one content to the external electronic device 202. For example, the electronic device 201 may select at least one content according to a specified setting. For another example, when the input to the casting button 320 is received, the electronic device 201 may provide a separate UI (e.g., a pop-up image) for receiving setting information for selecting contents, and select at least one content based on the input to the provided UI.

According to various embodiments of the present disclosure, the first UI 301 may include a setting button 330. For example, when an input to the setting button 330 is received, the electronic device 201 may provide a separate UI (e.g., a pop-up image) for setting at least one option related to content selection.

According to various embodiments of the present disclosure, the electronic device 201 may transmit information on at least one content selected from the content list 310 to the external electronic device 202. For example, in the example of FIG. 3, the electronic device 201 may select the second content 312 and the fourth content 314 from among the contents of the content list 310 according to a specified setting. In this case, the electronic device 201 may transmit, to the external electronic device 202, the recommended content information list including information on the second content 312 (e.g., an internet protocol (IP) address associated with the second content 312) and information on the fourth content 314 (e.g., an IP address associated with the fourth content 314).

According to various embodiments of the present disclosure, the external electronic device 202 may play contents of the recommended content information list received from the electronic device 201. For example, the external electronic device 202 may add the received recommended content information list to the queue of the external electronic device 202. For example, if there is information on at least one content in the queue of the external electronic device 202, the newly received information on the content may be added in front of or after the existing information on the content. According to an embodiment of the present disclosure, the external electronic device 202 may play the contents of the queue. For example, in the example of FIG. 3, the external electronic device 202 may play the second content 312 located foremost in the queue. According to an embodiment of the present disclosure, the external electronic device 202 may play the contents in the queue by using an application for content casting that is installed in the external electronic device 202. For example, the queue may be managed by the application for content casting.

Hereinafter, various methods will be described with reference to FIGS. 4 to 10, in which the electronic device 201 generates the recommended content information list from the content list 310. Unless otherwise described, operations of the electronic device 201 and the external electronic device 202 described above may be commonly applied to the following description.

Figure 4:
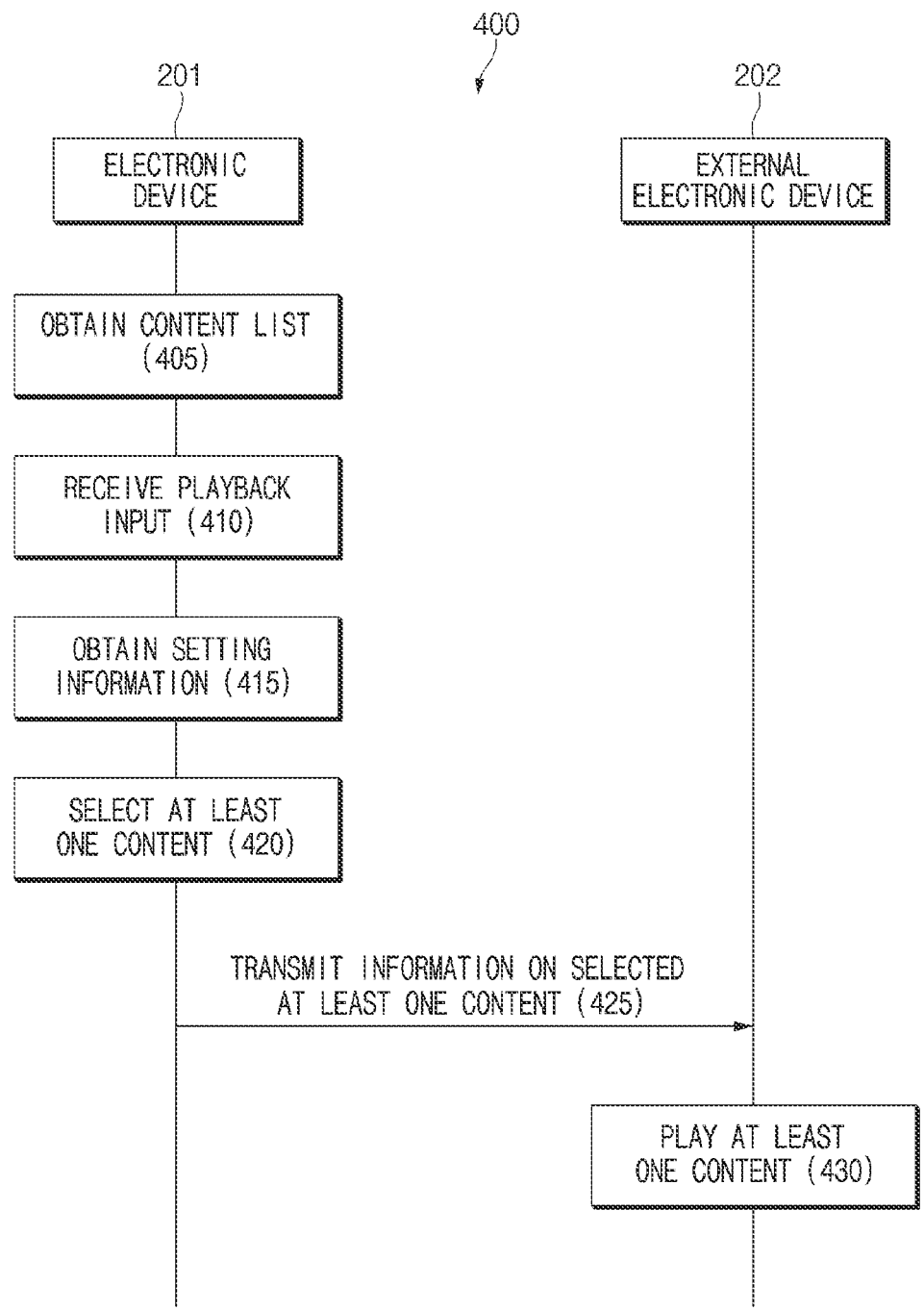
FIG. 4 is a signal flow diagram of a content casting method according to various embodiments of the present disclosure.

FIG. 4 is a signal flow diagram 400 of a content casting method according to various embodiments of the present disclosure.

According to various embodiments of the present disclosure, in operation 405, the electronic device 201 (e.g., the processor 220 of FIG. 2) may obtain a content list. For example, the electronic device 201 may obtain the content list from a contents provider by using a communication circuit (e.g., the communication circuit 290 of FIG. 2). The content list may be generated by, for example, the user or the contents provider. According to an embodiment of the present disclosure, the content list may include information on a plurality of contents (e.g., a representative image, title, description, author, publisher, author, playback time information, genre, information on the recommended age for watching, and/or representative video). According to an embodiment of the present disclosure, the electronic device 201 may provide a UI (e.g., the first UI 301 of FIG. 3) that displays the obtained content list.

According to various embodiments of the present disclosure, in operation 410, the electronic device 201 may receive a playback input. For example, the playback input may be an input for instructing playback (e.g., content casting) using the external electronic device 202. For example, when an input to the casting button 320 of FIG. 3 is received, the electronic device 201 may determine that the playback input has been received.

According to various embodiments of the present disclosure, in operation 415, the electronic device 201 may obtain setting information. For example, the setting information may include at least one setting for selecting at least one content from the content list. For example, the setting information may include at least one of a user state, a content type, and/or an external electronic device state. According to an embodiment of the present disclosure, the electronic device 201 may provide a separate UI for receiving a setting from a user in response to a playback input and obtain the setting from the user input. According to an embodiment of the present disclosure, the electronic device 201 may obtain setting information from the set setting.

According to various embodiments of the present disclosure, in operation 420, the electronic device 201 may select at least one content from the content list based on the setting information. According to an embodiment of the present disclosure, the electronic device 201 may select at least one content from the content list based on at least one of a user state, a content type, and/or an external electronic device state. For example, the user state may include a time during which the user may watch (e.g., view) content. For example, the content type may include a content genre, a content quality (e.g., image quality and/or sound quality), and/or a content watching restriction (e.g., a recommended age for watching). For example, the external electronic device state may include current watching channel information of the external electronic device 202 and/or current reservation information of the external electronic device 202.

According to various embodiments of the present disclosure, in operation 425, the electronic device 201 may transmit the information on the selected at least one content (e.g., the recommended content information list) to the external electronic device 202. For example, the electronic device 201 may transmit the information on the selected at least one content via a network (e.g., the first network 198 of FIG. 2) by using the communication circuit. For example, the information on the selected at least one content may include at least content address information.

According to various embodiments of the present disclosure, in operation 430, the external electronic device 202 may play at least one content corresponding to the received information on the at least one content. For example, the external electronic device 202 may store the received information on the at least one content in the queue and play the contents of the queue.

Figure 5:
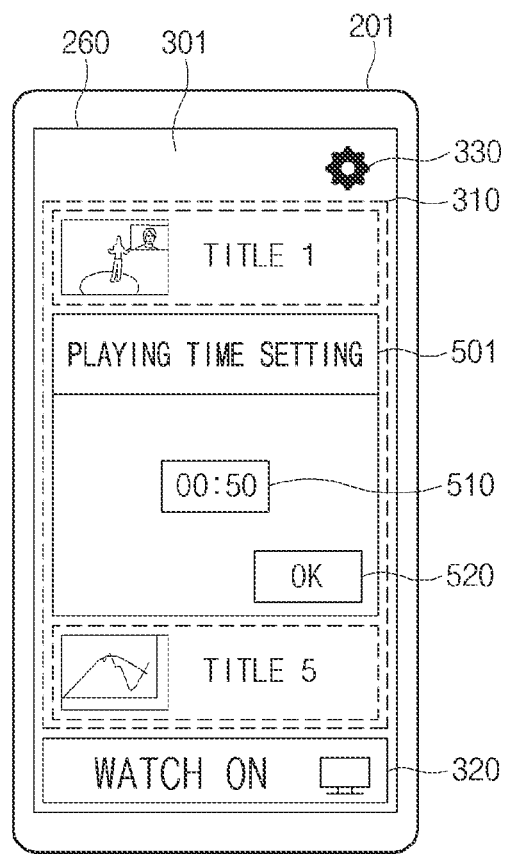
FIG. 5 illustrates a time setting user interface (UI) according to various embodiments of the present disclosure.

FIG. 5 illustrates a time setting UI 501 according to various embodiments of the present disclosure.

According to various embodiments of the present disclosure, the electronic device 201 may select at least one content from the content list 310 based at least on the user state. For example, the user state may select a time during which the user may view content.

According to various embodiments of the present disclosure, when an input to the casting button 320 or the setting button 330 is received, the electronic device 201 may display the time setting UI 501 for setting a content viewing time of the user on the display 260. For example, the time setting UI 501 may include a time selection UI 510 and an OK button 520 for receiving the time setting input of the user. The time setting UI 501 of FIG. 5 is exemplary, and embodiments of the present disclosure are not limited thereto.

For example, as illustrated in FIG. 5, the user may set the content viewing time to 50 minutes. According to various embodiments of the present disclosure, the electronic device 201 may select at least one content corresponding to the set content viewing time, from among a plurality of contents of the content list 310. For example, the electronic device 201 may select the content such that the sum of the playback times of the selected contents is less than or equal to the set playback time, and the sum of the playback times is the closest to the set content playback time. For another example, the electronic device 201 may select the content such that the sum of the playback times of the selected contents is included within any range (e.g., a range of approximately 95% to 105% from a specified time) from the set playback time.

For example, the user may want to view the content on a TV (e.g., the external electronic device 202 of FIG. 2) and go out approximately 50 minutes later. In this case, if the user casts all the contents of the content list 310 to the TV, the contents may be being played when the user goes out. Accordingly, by selecting the contents to be cast based on the playback time, it is possible to prevent the case where the contents may not be played until the end.

In an embodiment of the present disclosure, referring to FIG. 3, a playback time of the first content 311 may be 80 minutes, a playback time of the second content 312 may be 35 minutes, and a playback time of the third content 313 may be 20 minutes, a playback time of the fourth content 314 may be 15 minutes, and a playback time of the fifth content 315 may be 24 minutes. For example, the set playback time may be 50 minutes. In this case, the electronic device 201 may select the second content 312 and the fourth content 314 based on the user state (e.g., the set playback time), and transmit information on the selected second content 312 and fourth content 314 to the external electronic device 202.

Referring to FIG. 5, it has been described that the electronic device 201 may obtain the user state (e.g., playback time information) using the time setting UI 510. According to another embodiment of the present disclosure, the electronic device 201 may obtain and/or determine playback time information by using other application information of the electronic device 201. According to an embodiment of the present disclosure, the electronic device 201 may obtain playback time information based on user schedule information of a schedule application. For example, when a casting input is received, the electronic device 201 may calculate the playback time by using the user's scheduled time to go out based on the schedule information of the user (e.g., the schedule information of the user stored in the calendar or schedule application), and select at least one content corresponding to the playback time. According to an embodiment of the present disclosure, the electronic device 201 may obtain the playback time information based on estimated information on the public transport arrival. For example, when a public transport arrival notification (e.g., a specified bus arrival notification) is set in a public transport guidance application, the electronic device 201 may calculate the playback time by using the estimated arrival time of the specified public transport. For example, when a bus which is specified for notification arrives at a stop nearest to the electronic device 201 after A minutes, the electronic device 201 may determine the playback time based at least on the estimated arrival time (e.g., A minutes), the distance between the electronic device 201 and the stop, and/or the estimated time to be taken from the electronic device 201 to the stop. For example, the electronic device 201 may determine the playback time to be less than the estimated arrival time. According to an embodiment of the present disclosure, the electronic device 201 may select at least one content based on the playback time, and then transmit information on the selected at least one content and information on the notification content to the external electronic device 202. For example, the external electronic device 202 may play the notification content when the playback of the content corresponding to the received information on at least one content is completed. According to an embodiment of the present disclosure, if the electronic device 201 obtains the playback time according to the setting by the user or based on the specified notification, the electronic device 201 may transmit notification content information to the external electronic device 202 such that the notification content is played by the external electronic device 202 after the playback of the selected other content is completed. The notification content may be set by a user or be a set web content. For example, if the electronic device 201 determines the playback time based on the bus arrival notification of the user, the electronic device 201 may transmit the notification content information to the external electronic device 202 together with the content information corresponding to the playback time. Since the notification content is played after the content corresponding to the playback time is played, the user of the electronic device 201 may receive the specified notification (e.g., a bus arrival notification) through the external electronic device 202 as well as the electronic device 201.

In various embodiments of the present disclosure, it has been described that the electronic device 201 selects content according to various criteria and transmits information on the selected content to the external electronic device 202; however, embodiments of the present disclosure are not limited thereto. According to an embodiment of the present disclosure, the electronic device 201 may select at least one content based on the playback time, and then play the selected at least one content on the electronic device 201.

Figure 6:
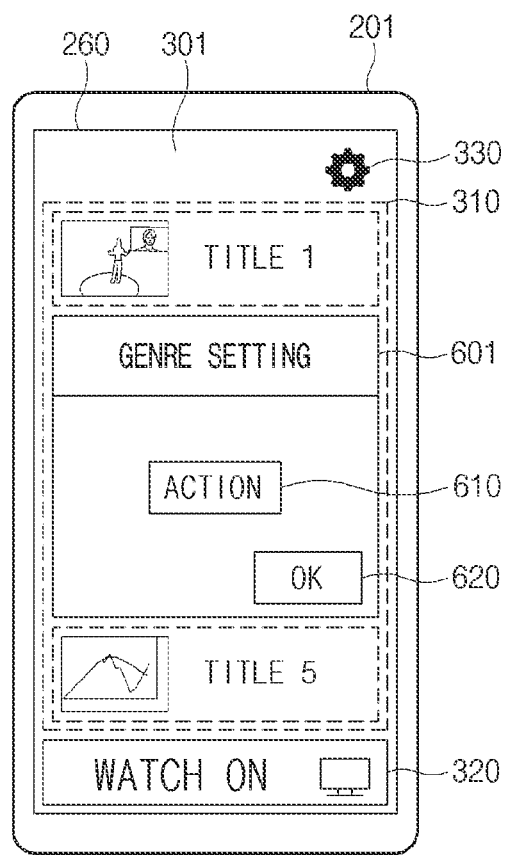
FIG. 6 illustrates a content setting UI according to various embodiments of the present disclosure.

FIG. 6 illustrates a content setting UI 601 according to various embodiments of the present disclosure.

According to various embodiments of the present disclosure, the electronic device 201 may select at least one content from the content list 310 based at least on the content type. For example, the content type may include a content genre, a content quality (e.g., image quality and/or sound quality), and/or a content viewing restriction (e.g., a recommended age for viewing).

According to various embodiments of the present disclosure, when an input to the casting button 320 or the setting button 330 is received, the electronic device 201 may display the content setting UI 601 for setting a content type on the display 260. For example, the content setting UI 601 may include a type selection UI 610 and an OK button 620 for receiving the content setting input of the user. The content setting UI 601 of FIG. 6 is exemplary, and embodiments of the present disclosure are not limited thereto. For example, the content setting UI 601 may include a UI for setting a content quality (e.g., image quality and/or sound quality), and/or a content viewing restriction (e.g., a recommended age for viewing), in addition to the genre.

For example, as illustrated in FIG. 6, the user may set the content type to 'ACTION'. According to various embodiments of the present disclosure, the electronic device 201 may select at least one content corresponding to the set content type, from among a plurality of contents of the content list 310.

For example, the user may want to view content with other family members on a TV in the living room (e.g., the external electronic device 202 of FIG. 2). In this case, the user may set the content type to 'action genre' in order to select a content genre that all family members like or exclude the content inappropriate for some family members.

In one embodiment of the present disclosure, referring to FIG. 3, the genre of the first content 311 may be 'action', the genre of the second content 312 may be 'comedy', the genre of the third content 313 may be 'action', and the genre of the fourth content 314 may be 'soap opera', and the genre of the fifth content 315 may be 'adult content'. For example, if the set content type is 'action', the electronic device 201 may select the first content 311 and the third content 313 based on the set content type, and transmit information on the selected first content 311 and third content 313 to the external electronic device 202.

Figure 7:
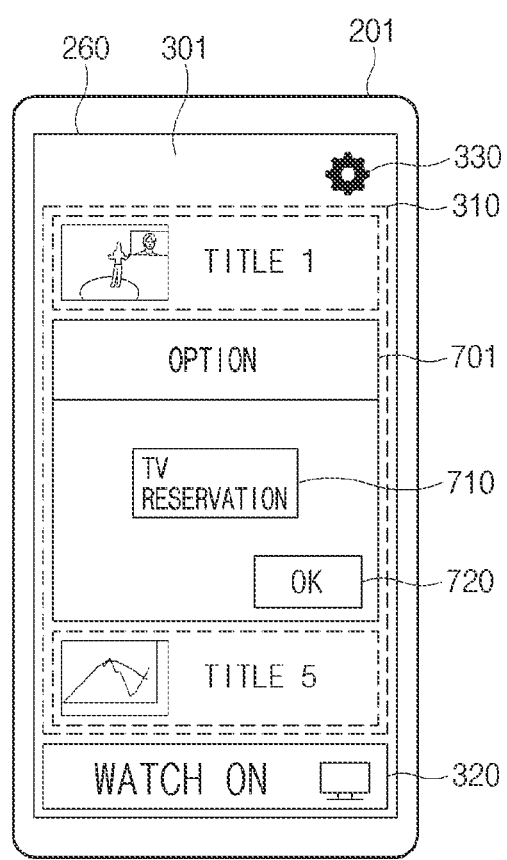
FIG. 7 illustrates an external electronic device state setting UI according to various embodiments of the present disclosure.

FIG. 7 illustrates an external electronic device state setting UI 701 according to various embodiments of the present disclosure.

According to various embodiments of the present disclosure, the electronic device 201 may select at least one content from the content list 310 based at least on a state of an external electronic device (e.g., the external electronic device 202 of FIG. 2). For example, the external electronic device state may include current viewing channel information of the external electronic device 202 and/or current reservation information of the external electronic device 202.

According to various embodiments of the present disclosure, when an input to the casting button 320 or the setting button 330 is received, the electronic device 201 may display, on the display 260, an external electronic device state setting UI 701 for setting the state of the external electronic device to be considered in the user's content selection. For example, the external electronic device state setting UI 701 may include a state setting selection UI 710 and an OK button 720 for receiving the external electronic device setting input of the user. The external electronic device state setting UI 701 of FIG. 7 is exemplary, and embodiments of the present disclosure are not limited thereto. For example, the external electronic device state setting UI 701 may include an interface for inputting current viewing channel information of the external electronic device.

According to an embodiment of the present disclosure, the electronic device 201 may select at least one content for casting based on reservation information (e.g., viewing reservation information) of the external electronic device. For example, as illustrated in FIG. 7, the user may set the external electronic device state setting to 'TV RESERVATION'. In this case, the electronic device 201 may select at least one content based on the reservation information of the external electronic device 202. For example, if a program exists that is reserved for viewing, starting in 50 minutes, in the external electronic device 202, the electronic device 201 may select at least one content by setting 50 minutes as the viewing time. For example, the electronic device 201 may select the content such that the sum of the playback times of the selected contents is less than or equal to the set playback time, and the sum of the playback times is the closest to the set content playback time. For another example, the electronic device 201 may select the content such that the sum of the playback times of the selected contents is included within any range (e.g., a range of approximately 95% to 105% from a specified time) from the set playback time. According to an embodiment of the present disclosure, the electronic device 201 may receive reservation information of the external electronic device 202 from the external electronic device 202. For example, the electronic device 201 may request the external electronic device 202 to transmit viewing reservation information and receive reservation information from the external electronic device 202. According to an embodiment of the present disclosure, the electronic device 201 may receive reservation information of the external electronic device 202 from a user input. For example, the electronic device 201 may provide a UI for inputting the reservation information.

According to an embodiment of the present disclosure, the electronic device 201 may select at least one content for casting based on viewing information (e.g., current viewing channel information) of the external electronic device. For example, the electronic device 201 may select at least one content based on channel programming information of a channel currently viewed by the external electronic device 202. For example, the electronic device 201 may estimate the advertisement time of the current channel based on channel programming information of the current channel of the external electronic device 202. In this case, the electronic device 201 may set at least one content corresponding to the estimated advertisement time. For example, the electronic device 201 may transmit information on the content, which is selected based on the end time of the current viewing program in the current channel of the external electronic device 202, so that the selected content is played by the external electronic device 202 during the advertisement time. According to an embodiment of the present disclosure, the electronic device 201 may receive channel information of the external electronic device 202 from the external electronic device 202. For example, the electronic device 201 may request the external electronic device 202 to transmit channel information and receive the channel information from the external electronic device 202. According to an embodiment of the present disclosure, the electronic device 201 may receive channel information of the external electronic device 202 from a user input. For example, the electronic device 201 may provide a UI for inputting the reservation information. According to an embodiment of the present disclosure, the electronic device 201 may obtain channel programming information corresponding to a channel by using the received channel information (e.g., through an Internet search), and estimate an advertisement time from the obtained channel programming information.

Figure 8:
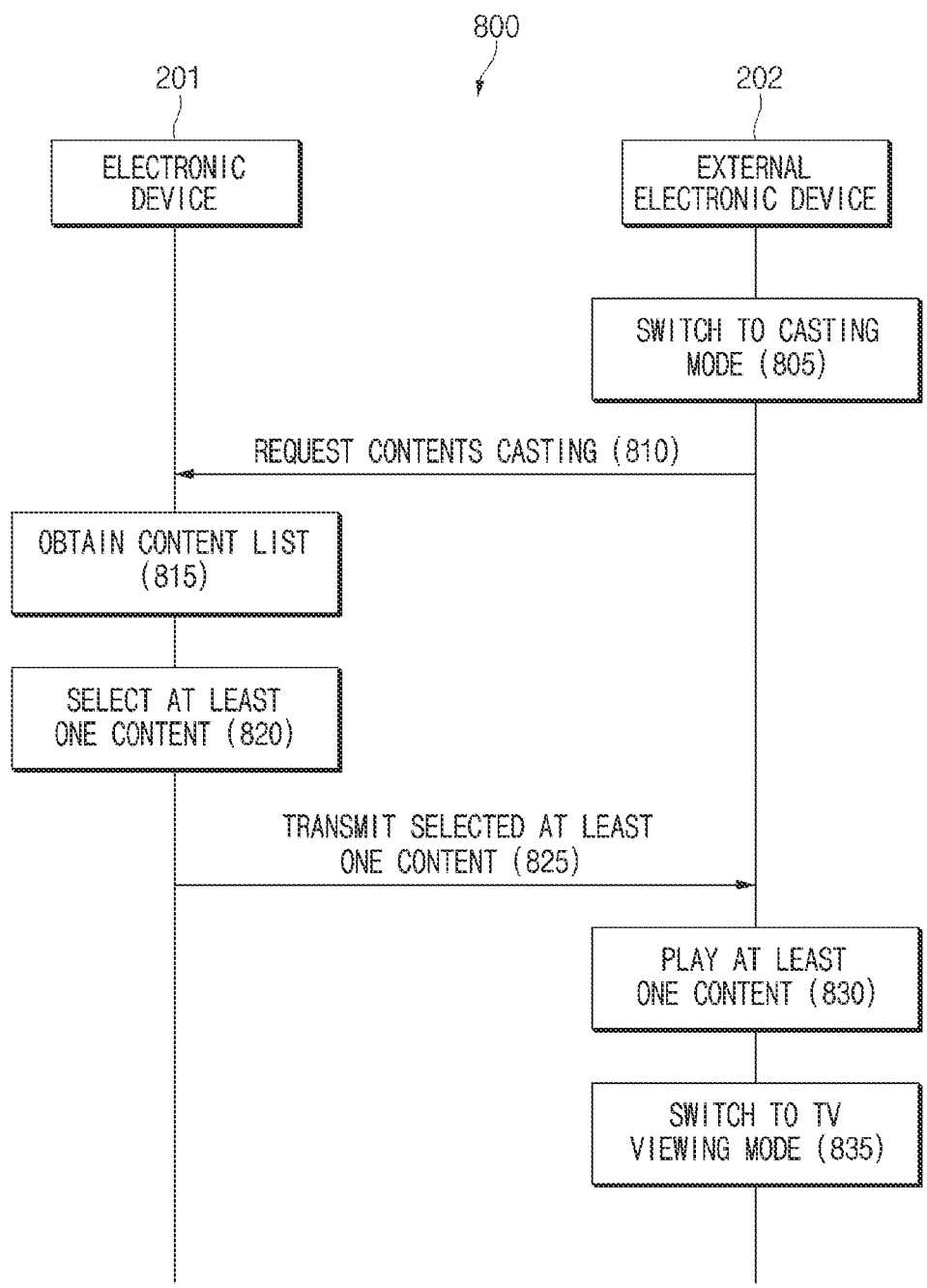
FIG. 8 is a signal flow diagram of a content casting method according to various embodiments of the present disclosure.

FIG. 8 is a signal flow diagram of a content casting method according to various embodiments of the present disclosure.

According to an embodiment of the present disclosure, the external electronic device 202 may request the electronic device 201 to cast contents.

According to various embodiments of the present disclosure, in operation 805, the external electronic device 202 may switch to a casting mode. For example, based on the input of the user, the external electronic device 202 may switch an operation mode from a TV viewing mode for viewing over-the-air or cable broadcasting to a casting mode for content casting. For example, when an advertisement starts while viewing a broadcast, the user may change the operation mode of the external electronic device 202 to view contents on the Internet.

According to various embodiments of the present disclosure, in operation 810, the external electronic device 202 may request the electronic device 201 to cast video in response to the switching to the casting mode. According to an embodiment of the present disclosure, the request for video casting may include state information or playback time information of the external electronic device 202. For example, the request for video casting may include viewing reservation information and/or previous viewing channel information of the external electronic device 202. For another example, the request for video casting may include playback time information in which video casting is requested.

According to various embodiments of the present disclosure, in operation 815, the electronic device 201 may obtain a content list in response to the request for content casting from the external electronic device 202. For example, the electronic device 201 may obtain the content list according to the method of obtaining the content list (405) of FIG. 4. For another example, the electronic device 201 may have obtained the content list before receiving the request for content casting. If the electronic device 201 has the content list upon receiving the request for content casting, the electronic device 201 may omit operation 815.

According to various embodiments of the present disclosure, in operation 820, the electronic device 201 may select at least one content from the content list. For example, the electronic device 201 may select at least one content by using the viewing reservation information and/or the previous viewing channel information. The selecting of at least one content based on viewing reservation information and/or channel information of the electronic device 201 is as described above with reference to FIG. 7.

According to various embodiments of the present disclosure, in operation 825, the electronic device 201 may transmit the information on the selected at least one content (e.g., the recommended content information list) to the external electronic device 202. For example, the information on the selected at least one content may include at least content address information.

According to various embodiments of the present disclosure, in operation 830, the external electronic device 202 may play at least one content corresponding to the received information on the at least one content. For example, the external electronic device 202 may store the received information on the at least one content in the queue and play the content.

According to various embodiments of the present disclosure, in operation 835, the external electronic device 202 may switch the operation mode to the TV viewing mode when the playback of the content is completed.

Figure 9:
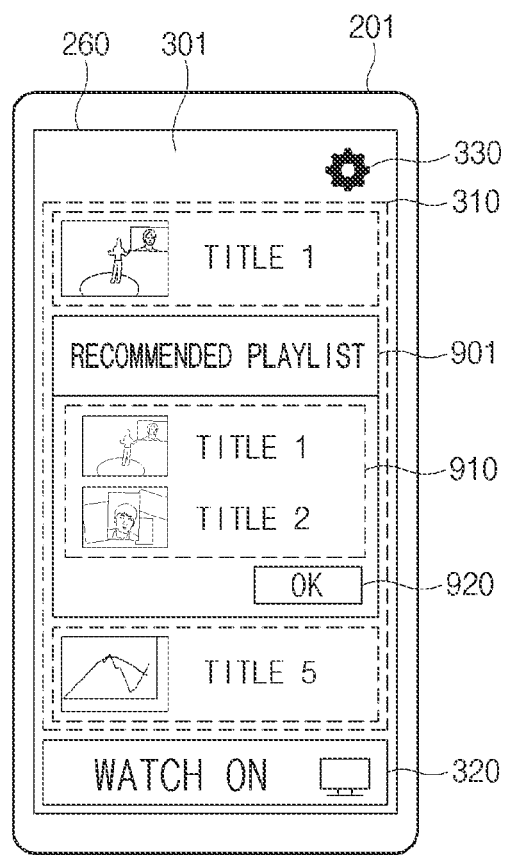
FIG. 9 illustrates a content recommendation UI according to various embodiments of the present disclosure.

FIG. 9 illustrates a content recommendation UI 901 according to various embodiments of the present disclosure.

With reference to FIGS. 2 to 8, the electronic device 201 may select at least one content from the content list 310 and then provide information on the selected at least one content information to the user. According to various embodiments of the present disclosure, the electronic device 201 may display, on the display 260, the recommendation UI 901 including information on at least one content selected from the content list 310.

For example, the recommendation UI 901 may include a recommended content information list 910 and an OK button 920. According to an embodiment of the present disclosure, the electronic device 201 may select at least one content and then provide the information on the selected content through the recommendation UI 901, and when a user input to the OK button 920 is received, may transmit the information on the content in the recommended content information list 910 which corresponds to the information on the selected content.

The recommendation UI 901 of FIG. 9 is exemplary, and the electronic device 201 may transmit information on content corresponding to the recommended content information list 910 to the external electronic device 202 without providing the recommendation UI 901. For another example, the electronic device 201 may transmit, to the external electronic device 202, information on content corresponding to the recommended content information list 910, regardless of the input to the OK button 920 of the recommendation UI 901.

Figure 10:
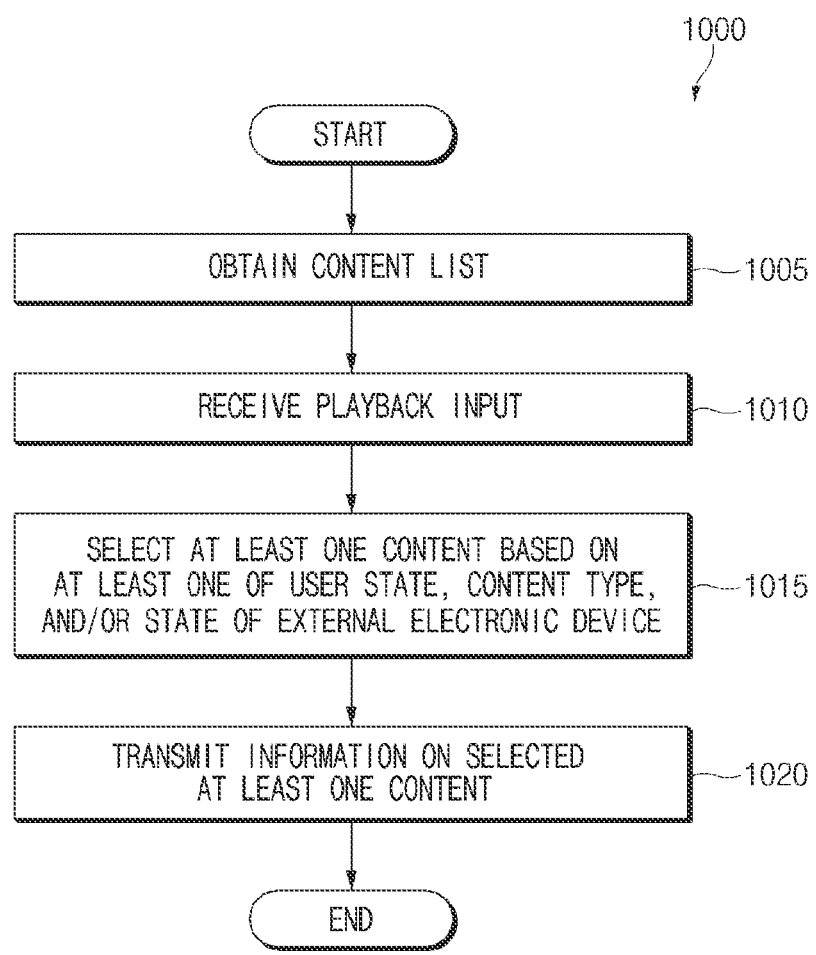
FIG. 10 is a flowchart of a content casting method according to various embodiments of the present disclosure.

FIG. 10 is a flowchart 1000 of a content casting method according to various embodiments of the present disclosure. Hereinafter, the electronic device and the components of the electronic device may be referred to by the components described above with reference to FIG. 2.

According to various embodiments of the present disclosure, in operation 1005, the processor 220 of the electronic device 201 may obtain a content list. For example, the processor 220 may obtain the content list from an external server by using the communication circuit 290 of the electronic device 201. For example, the obtaining of the content list may include obtaining information on the contents included in the content list. For example, the information on the contents may include content address information. The information on the contents may further include, for example, at least one of a representative image, title, description, author, publisher, author, playback time information, genre, information on the recommended age for viewing, and/or representative video. According to an embodiment of the present disclosure, the processor 220 may display, on the display 260, a UI (e.g., the first UI 301 of FIG. 3) for displaying the obtained content list.

According to various embodiments of the various embodiments, in operation 1010, the processor 220 may receive a playback input. For example, the playback input may correspond to an input for instructing content casting using an external electronic device (e.g., the external electronic device 202 of FIG. 2). For example, when an input to the casting button 320 of FIG. 3 is received, the electronic device 201 may determine that the playback input has been received.

According to various embodiments of the present disclosure, in operation 1015, the processor 220 may select at least one content from among contents in the content list based on at least one of a user state, a content type, and/or an external electronic device state.

According to an embodiment of the present disclosure, the processor 220 may select at least one content based on the user state. For example, the processor 220 may select at least one content based on the playback time set based on a user input (e.g., the user input to the time setting UI 501 of FIG. 5). For example, the processor 220 may estimate the playback time based on schedule information of the user, and select at least one content based on the estimated playback time.

According to an embodiment of the present disclosure, the processor 220 may select at least one content based on the content type. For example, the processor 220 may select at least one content corresponding to the type set based on a user input (e.g., the user input to the content setting UI 601 of FIG. 6). For example, the content type may include at least one of a content genre, a content quality (e.g., image quality and/or sound quality), and/or a content viewing restriction (e.g., a recommended age for viewing). If a plurality of parameters (e.g., genre, quality, and/or viewing restriction) are set in relation to the content type, the processor 220 may select the content that satisfies all of the plurality of parameters.

According to an embodiment of the present disclosure, the processor 220 may select at least one content based on the state of the external electronic device. For example, the processor 220 may obtain information on the state of the external electronic device from the external electronic device 202 by using the communication circuit 290 and determine a playback time based on the information on the state. The electronic device 201 may select at least one content corresponding to the determined playback time. For example, the electronic device 202 may obtain programming information based on current viewing channel information and may determine the playback time based on the programming information. For another example, the electronic device 202 may determine the playback time from reservation information of the external electronic device 202.

According to an embodiment of the present disclosure, the processor 220 may select at least one content based on the user state and the content type. For example, the processor 220 may determine the playback time from the user state, and select at least one content corresponding to the determined playback time and the set content type.

According to an embodiment of the present disclosure, the processor 220 may select at least one content based on the content type and the state of the external electronic device. For example, the processor 220 may determine the playback time from the state of the external electronic device, and select at least one content corresponding to the determined playback time and the set content type.

According to an embodiment of the present disclosure, the processor 220 may select at least one content based on the user state and the state of the external electronic device. For example, the processor 220 may select at least one content to correspond to a shorter playback time of the playback time determined from the user state and the playback time determined from the state of the external electronic device.

According to an embodiment of the present disclosure, the processor 220 may select at least one content based on the user state, the content type, and the state of the external electronic device. For example, the processor 220 may set a shorter time of the playback time determined from the user state and the playback time determined from the state of the external electronic device as the playback time. For example, the processor 220 may select at least one content corresponding to the set playback time and the set content type.

According to various embodiments of the present disclosure, in operation 1020, the processor 220 may transmit the information on the selected at least one content (e.g., the recommended content information list) to the external electronic device 202. For example, the processor 220 may transmit, to the external electronic device 202, information on at least content selected using the communication circuit 290. For example, the electronic device 220 may control the external electronic device 202 such that the external electronic device 202 plays the information on the selected at least one content, by transmitting the information on the selected at least one content to the external electronic device 202.

According to various embodiments of the present disclosure, an electronic device (e.g., the electronic device 201 of FIG. 2) may include a display (e.g., the display 260 of FIG. 2), a communication circuit (e.g., the communication circuit 290 of FIG. 2), a processor (e.g., the processor 220 of FIG. 2) operatively connected with the display and the communication circuit, and a memory (e.g., the memory 230 of FIG. 2) operatively connected with the processor. The memory may store instructions that, when executed, cause the processor to perform operations to be described below. According to an embodiment of the present disclosure, the processor may obtain a content list including information on a plurality of contents from an external server by the communication circuit (operation 1005 of FIG. 10), select at least one content from the content list based on at least one of a user state, a content type, or an external electronic device (e.g., the external electronic device 202 of FIG. 2) state (e.g., operation 1015 of FIG. 10), and transmit information on the selected at least one content to the external electronic device in order to cause the external electronic device to play the selected at least one content through a short-range wireless network by the communication circuit (e.g., operation 1020 of FIG. 10).

For example, the user state may include viewing available time information of a user or schedule information of the user. According to an embodiment of the present disclosure, when executed, the instructions may cause the processor to select at least one content corresponding to a playback time determined based on the viewing available time or the schedule information of the user, from among a plurality of contents in the content list.

According to an embodiment of the present disclosure, when executed, the instructions may cause the processor to select at least one content corresponding to the content type from among the plurality of contents in the content list. For example, the content type may include at least one of a content genre, a content quality, or a recommended age for content viewing.

For example, the external electronic device state may include viewing reservation information of the external electronic device. According to an embodiment of the present disclosure, when executed, the instructions may cause the processor to determine a playback time based on a time left until a start of the broadcast program reserved based on the viewing reservation information, and select at least one content corresponding to the determined playback time, from among the plurality of contents in the content list.

For example, the external electronic device state may include current viewing channel information of the external electronic device. According to an embodiment of the present disclosure, when executed, the instructions may cause the processor to obtain broadcast programming information corresponding to the current channel information by using the current viewing channel information, determine an advertisement time based on the obtained broadcast programming information, and select at least one content corresponding to the determined advertisement time, from among the plurality of contents in the content list.

According to an embodiment of the present disclosure, when executed, the instructions may cause the processor to display, on the display, a user interface displaying content information corresponding to the content list if the content list is obtained.

According to an embodiment of the present disclosure, when executed, the instructions may cause the processor to display, on the display, a user interface (e.g., the first UI 301 of FIG. 3) providing the information on the at least one content if the at least one content is selected, and transmit the information on the selected at least one content to the external electronic device if a user input to the user interface (e.g., the input to the casting button 320) is received.

For example, the information on the selected at least one content may include an access address of each of the selected at least one content.

A content casting method of an electronic device according to various embodiments of the present disclosure may include obtaining a content list including information on a plurality of contents from an external server (operation 1005 of FIG. 1), selecting at least one content from the content list based on at least one of a user state, a content type, or an external electronic device state (operation 1015 of FIG. 10), and transmitting information on the selected at least one content to the external electronic device in order to cause the external electronic device to play the selected at least one content through a short-range wireless network (operation 1020 of FIG. 10).

For example, the user state may include viewing available time information of a user or schedule information of the user. According to an embodiment of the present disclosure, the selecting of the at least one content may include selecting at least one content corresponding to a playback time determined based on the viewing available time or the schedule information of the user, from among a plurality of contents in the content list.

According to an embodiment of the present disclosure, the selecting of the at least one content may include selecting at least one content corresponding to the content type from among the plurality of contents in the content list. For example, the content type may include at least one of a content genre, a content quality, or a recommended age for content viewing.

For example, the external electronic device state may include viewing reservation information of the external electronic device. According to an embodiment of the present disclosure, the selecting of the at least one content may include determining a playback time based on a time left until a start of a broadcast program reserved based on the viewing reservation information, and selecting at least one content corresponding to the determined playback time, from among the plurality of contents in the content list.

For example, the external electronic device state may include current viewing channel information of the external electronic device. According to an embodiment of the present disclosure, the selecting of the at least one content may include obtaining broadcast programming information corresponding to the current channel information by using the current viewing channel information, determining an advertisement time based on the obtained broadcast programming information, and selecting at least one content corresponding to the determined advertisement time, from among the plurality of contents in the content list.

According to an embodiment of the present disclosure, the content casting method may further include displaying, on the display of the electronic device, a user interface displaying content information corresponding to the content list if the content list is obtained.

According to an embodiment of the present disclosure, the content casting method may further include displaying, on the display of the electronic device, a user interface providing the information on the at least one content if the at least one content is selected. For example, the transmitting of the information on the selected at least one content to the external electronic device may include transmitting the information on the selected at least one content to the external electronic device if a user input to the user interface is received.

According to various embodiments of the present disclosure, a content casting system may include an electronic device (e.g., the electronic device 201 of FIG. 2) and an external electronic device (e.g., the external electronic device 201 of FIG. 2). According to an embodiment of the present disclosure, the electronic device may be configured to obtain a content list including information on a plurality of contents from an external server, select at least one content from the content list based on at least one of a user state, a content type, or an external electronic device state, and transmit information on the selected at least one content to the external electronic device in order to cause the external electronic device to play the selected at least one content through a short-range wireless network. According to an embodiment of the present disclosure, the external electronic device may be configured to add the information on the selected at least one content to a queue if the information on the selected at least one content is received, and play contents stored in the queue.

For example, the user state may include viewing available time information of a user or schedule information of the user. The electronic device may be configured to select at least one content corresponding to a playback time determined based on the viewing available time or the schedule information of the user, from among a plurality of contents in the content list.

According to an embodiment of the present disclosure, the electronic device may be configured to select at least one content corresponding to the content type from among the plurality of contents in the content list. For example, the content type may include at least one of a content genre, a content quality, or a recommended age for content viewing.

For example, the external electronic device state may include viewing reservation information of the external electronic device. According to an embodiment of the present disclosure, the electronic device may be configured to determine a playback time based on a time left until a start of a broadcast program reserved based on the viewing reservation information, and select at least one content corresponding to the determined playback time, from among the plurality of contents in the content list.

For example, the information on the selected at least one content may include an access address of each of the selected at least one content.

The invention claimed is:
1. An electronic device comprising:
a display;
a communication circuit;
a processor operatively connected with the display and the communication circuit; and
a memory operatively connected with the processor,
wherein the memory stores instructions that, when executed, cause the processor to:
 obtain a content list including information on a plurality of contents from an external server over an Internet by using the communication circuit;
 obtain current watching channel information of an external electronic device from the external electronic device over a short-range wireless network;

obtain channel programming information of a channel indicated by the current watching channel information;

estimate, based on the channel programing information, an advertisement time for a current viewing program of the external electronic device;

determine a playback time based on the estimated advertisement time;

select at least one content from the content list such that sum of playback time of the at least content is less than or equal to the determined playback time; and transmit, based on an end time of the current viewing program, information on the selected at least one content to the external electronic device in order to cause the external electronic device to play the selected at least one content during the estimated advertisement time.

2. The electronic device of claim 1, wherein when executed, the instructions cause the processor to display, on the display, a user interface displaying content information corresponding to the content list if the content list is obtained.

3. The electronic device of claim 1, wherein when executed, the instructions cause the processor to:

display, on the display, a user interface providing the information on the at least one content if the at least one content is selected; and transmit the information on the selected at least one content to the external electronic device if a user input to the user interface is received.

4. The electronic device of claim 1, wherein the information on the selected at least one content includes an access address of each of the selected at least one content.

5. A content casting method of an electronic device, comprising:

obtaining a content list including information on a plurality of contents over an Internet from an external server;

obtaining current watching channel information of an external electronic device from the external electronic device over a short-range wireless network;

obtaining channel programming information of a channel indicated by the current watching channel information;

estimating, based on the channel programing information, an advertisement time for a current viewing program of the external electronic device;

determining a playback time based on the estimated advertisement time;

selecting at least one content from the content list such that sum of playback time of the at least content is less than or equal to the determined playback time; and transmitting, based on an end time of the current viewing program, information on the selected at least one content to the external electronic device in order to cause the external electronic device to play the selected at least one content during the estimated advertisement time.

6. The method of claim 5, further comprising displaying, on a display of the electronic device, a user interface displaying content information corresponding to the content list if the content list is obtained.

7. The method of claim 5, further comprising displaying, on a display of the electronic device, a user interface providing the information on the at least one content if the at least one content is selected, wherein the transmitting of the information on the selected at least one content to the external electronic device includes transmitting the information on the selected at least one content to the external electronic device if a user input to the user interface is received.

\* \* \* \* \*